United States Patent [19]
Belanger et al.

[11] 3,750,486
[45] Aug. 7, 1973

[54] SAFETY DEVICE FOR NEUTRALIZING THE CLUTCH OF A SNOWMOBILE

[76] Inventors: Regis Belanger, St-Isidore, Quebec; Edouard Belanger, St-David, Quebec, both of Canada

[22] Filed: Dec. 9, 1971

[21] Appl. No.: 206,423

[30] Foreign Application Priority Data
July 2, 1971 Canada.............................. 117,290

[52] U.S. Cl........................ 74/230.17 E, 192/105 C
[51] Int. Cl............................................ F16h 55/52
[58] Field of Search ............................ 74/230.17 E; 192/105 C, 89 W, 114

[56] References Cited
UNITED STATES PATENTS
| | | | |
|---|---|---|---|
| 3,362,242 | 1/1968 | Watkins ....................... | 74/230.17 E |
| 3,675,500 | 7/1972 | Albertson..................... | 74/230.17 E |

FOREIGN PATENTS OR APPLICATIONS
| | | | |
|---|---|---|---|
| 96,066 | 2/1957 | Germany........................ | 192/105 C |

*Primary Examiner*—Charles J. Myhre
*Assistant Examiner*—R. H. Lazarus
*Attorney*—Raymond A. Robic

[57] ABSTRACT

Device for neutralizing, when starting up, the driving effect of a pulley having truncated cheeks of which a first one is secured on a rotary axle whereas a second one is slidably mounted thereon, the cheeks being biassed by a spring tending to move the second cheek from the first one, this movement being however subjected to the counter-effect of a governor mounted on the axle to rotate therewith and of which the centrifugal masses act on the second cheek to bring it back toward the first one as soon as the axle is brought into rotation beyond a predetermined speed. This device comprises a locking mechanism mounted on the axle to cooperate with the second cheek in such a manner as to prevent it, as soon as the axle starts rotating, from moving toward the first cheek under the action of the centrifugal masses. It also comprises a manually operable mechanism related to the said locking mechanism in such a way as to release, when operated, the second cheek so that it may suddenly be projected toward the first cheek when the axle is placed in rotation at a speed greater than the said predetermined speed. This locking mechanism comprises a collar solid with the second cheek and two levers pivotally mounted at one end on the axle so that their other end may move away from the axle under the effect of the centrifugal force. The collar and the levers are made so that the said other end of the levers may come in abutment against the collar when the axle starts rotating and thus hold it; the manually operable mechanism comprises means capable of holding the levers in abutment position, this means being displaceable at will to release the levers once the axle has reached the aforesaid predetermined speed.

5 Claims, 6 Drawing Figures

PATENTED AUG 7 1973 3,750,486

SAFETY DEVICE FOR NEUTRALIZING THE CLUTCH OF A SNOWMOBILE

The present invention relates to improvements in a transmission for a snowmobile, or the like vehicle, and more particularly to improvements to the pulley mounted on the driving axle.

This type of pulley has truncated cheeks of which a first one is secured on a rotary axle, generally the driving shaft, whereas a second cheek is slidably mounted thereon. The cheeks are subjected to the action of a spring tending to move the second cheek away from the first one, this movement being however opposed by a governor mounted on the axle and of which the centrifugal masses act on the second cheek to push it toward the first one as soon as the axle is brought into rotation beyond a predetermined speed. At a lower speed, the belt lies at the bottom of the groove of the pulley and is inactive, the pulley then idling.

In this type of mechanism, the belt starts to drive the track of the snowmobile as soon as the speed of the axle rises beyond the predetermined speed mentioned above. This situation does not usually present any difficulies since there are generally no particular reasons for starting up very rapidly and allowing the snowmobile to reach its cruising speed in the shortest possible time. In other words, there is usually no necessity for the snowmobile to have a high acceleration when starting up.

The situation is however quite different during competitions where time is an essential element, as is the case during a race. Unfortunately, the usual snowmobiles do not have any device for fast start up and it is precisely the object of the present invention to provide a mechanism that will allow the snowmobile to reach, starting from rest or from idling, its cruising or maximum speed in the shortest possible time period, that is give it an acceleration which is considerably greater than that permissible with known transmissions.

For this purpose, we have conceived a device intended to neutralize, when starting up, the driving effect of the transmission pulley by holding, at will, the movable jaw of the pulley to thus allow the axle to reach a high speed, without driving the belt. When the starting signal is given, the movable jaw is suddenly released and is, under the effect of the centrifugal masses of the governor, projected with force toward the other jaw which is stationary in translation. The belt is then suddenly clamped with a force which is greater the higher the speed of the axle at that particular moment. The belt then moves very rapidly toward the periphery of the pulley to take on the position that corresponds to the speed of the axle.

In accordance with the preferred embodiment of the invention, the locking mechanism comprises a collar solid with the second cheek and provided with at least one lever pivotally mounted at one of its ends on the axle in such a way that its other end may move away from the axle under the centrifugal force, the collar and the lever being so constructed that the said other end of the lever comes in abutment against the collar as soon as the axle starts rotating to thus hold the collar back and keep the second cheek from moving in translation on the axle. The manually operable mechanism comprises means capable of holding the lever in abutment position, such means being displaceable at will to release the lever once the speed of the axle has gone beyond the predetermined speed.

A better understanding of the invention will be afforded by the description that follows of a preferred embodiment thereof having reference to the appended drawings wherein.

Figure 1:
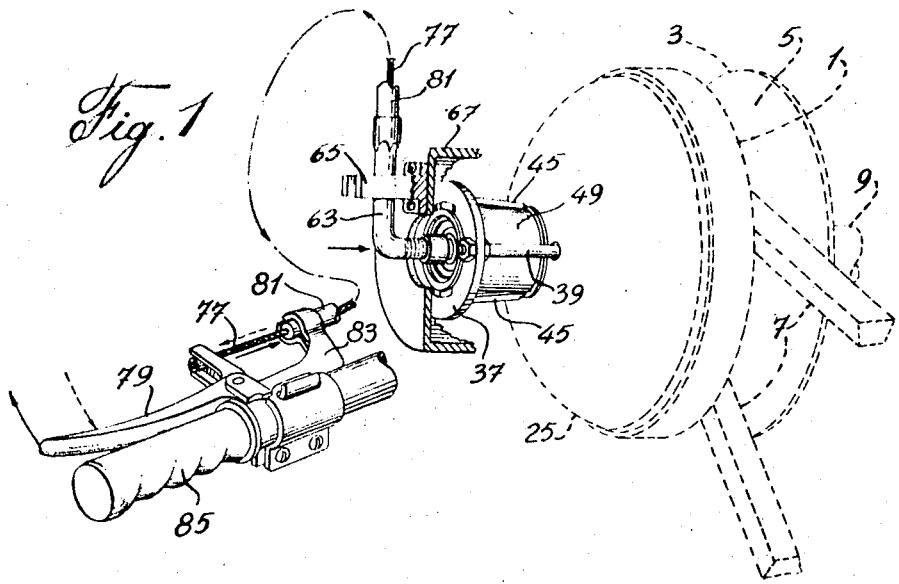
FIG. 1 is a perspective view, partially in cross-section, of a device applying the improvements of the invention, the part shown in broken line illustrating a conventional pulley.
Figure 2:
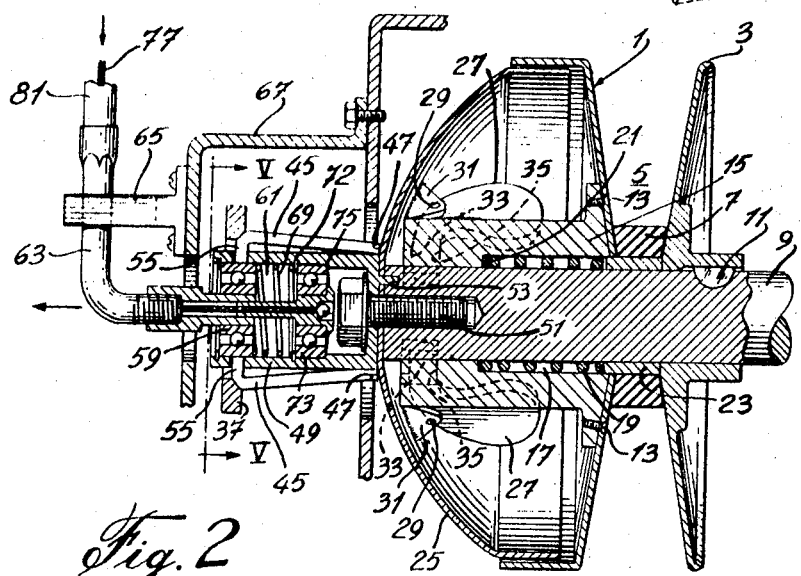
FIG. 2 is a longitudinal cross-sectional view of the device of the invention combined with a pulley of conventional type, the situation shown being that of the snowmobile starting up with the axle idling.
Figure 3:
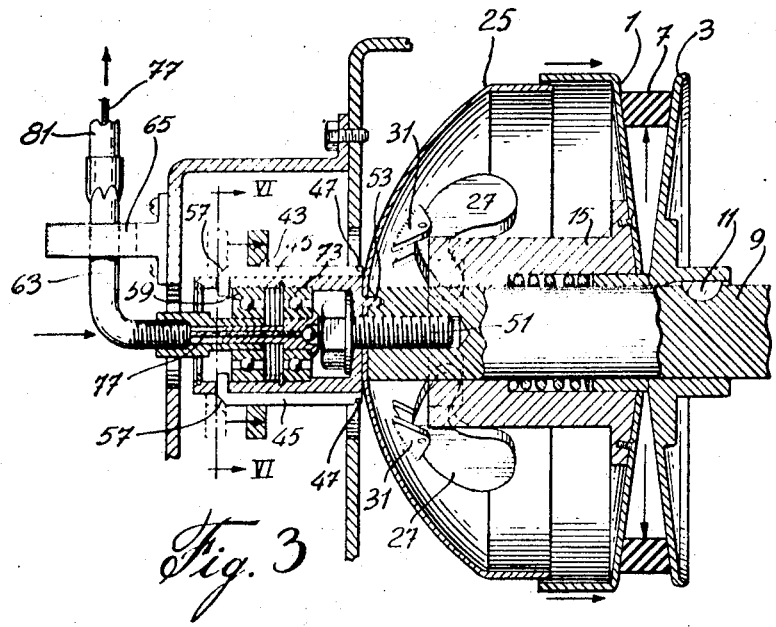
FIG. 3 is a cross-sectional view similar to that of FIG. 2 but illustrating the transmission with the axle having reached cruising speed.

Referring now more specifically to FIGS. 1, 2 and 3, the pulley improved by the addition of the device of the present invention is of the type having two truncated cheeks 1 and 3 defining therebetween a groove 5 in which a belt 7 winds. The cheek 3 is secured over the driving shaft or axle 9 for rotation therewith by means of a key 11, in known manner. On the other hand, the cheek 1 is slidably mounted on the axle 9, being secured by means of screws 13 to a sleeve 15 slid on the axle 9 in such a manner that it may freely move in translation thereon.

The sleeve 15 has an axial central counterbore 17 in which there is a spiral spring 19 wound around the axle 9 and respectively bearing against a shoulder 21 at the bottom of the counterbore 17 and a ring 23 resting by one end on the bottom of the cheek 3 and of which the outer diameter allows it to freely enter counterbore 17. Mounted inside a dome-shaped web 25 and secured to the axle 9 is a governor having centrifugal masses 27 pivoted, as at 29, on brackets 31 welded inside the dome 25. The governor has four masses 27 of which only two are shown. Each mass 27 extends into a protuberance 33 having a rounded end housed within a notch 35 provided on the outer face of the sleeve 15, the protuberance 33 bearing against a shoulder formed at the bottom of its notch 35.

The spring 19 has a pushing force sufficiently great so that when the axle 9 does not rotate or idles, at a speed within a predetermined speed, the belt 7 floats at the bottom of the groove 5 and is not driven.

Beyond this predetermined speed, called the idling speed, the centrifugal force developed by the masses 27, rotating about the pivots 29, is sufficient to overcome the resistance of the spring 19 so that the protuberances 33 drive the sleeve 15 and thus the cheek 1 toward the cheek 3. The belt 7 is thus compressed or clamped and driven into rotation while moving up in the groove 5 a distance depending on the speed of the axle.

The device and function described above are known and it does not appear useful or necessary to elaborate further.

The improvement according to the invention resides, as explained above, in the combination with a device of the aforesaid type, of a locking mechanism mounted on the axle 9 to cooperate with the second cheek 1 in such a way as to prevent its movement toward the first cheek, movement that it normally has under the effect of the centrifugal masses 27, as soon as the axle starts rotating, and of a manually operable mechanism combined with the aforesaid locking mechanism in such a way as to release, when actuated, the second cheek 1 to allow it to suddenly move toward the first cheek 3 when the axle 9 is brought into rotation at a speed which is beyond the aforementioned predetermined speed.

Figure 4:
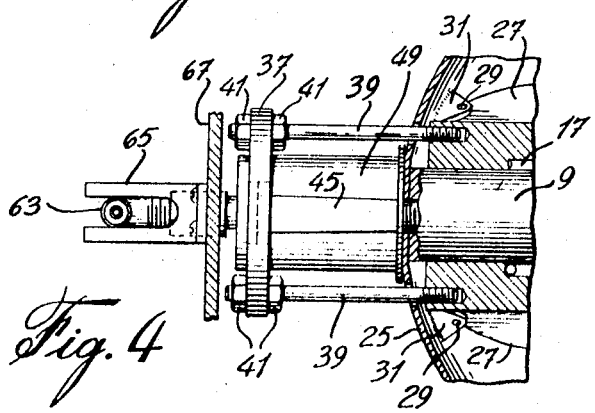
FIG. 4 is an elevation view of the locking device with part of the pulley being shown in cross-section.
Figure 5:
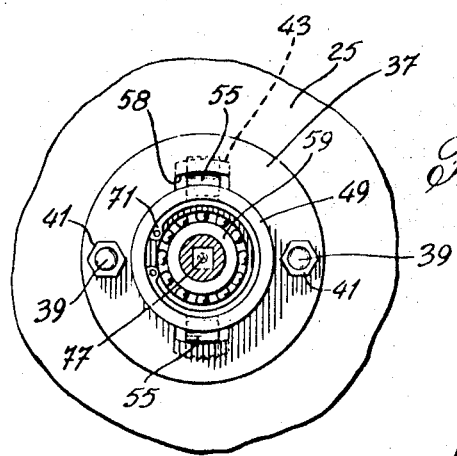
FIGS. 5 and 6 are respectively cross-sectional views in planes extending along lines V—V and VI—VI of FIGS. 2 and 3.
Figure 6:
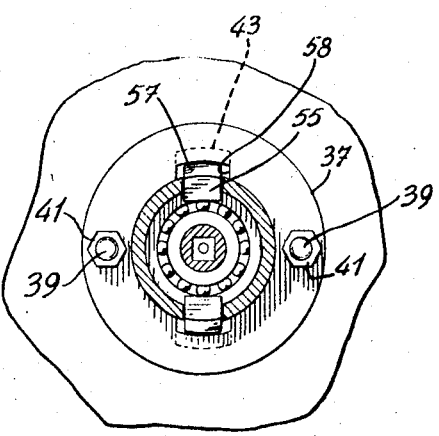

In the preferred form of the invention, the locking mechanism comprises a ring-shaped collar 37 made solid with the sleeve 15, and thus with the cheek 1, by means of elongated bolts 39 (FIG. 4) screwed at one end on a terminal face of sleeve 15 and secured at the other end on the collar 37 by means of nuts 41. It will be noted, in FIGS. 2 and 3, that the inner face of the collar 37 is bevelled at 43. The mechanism also comprises at least one lever 45, preferably two as illustrated, pivotally mounted at 47 on the axle 9 or, more precisely, on a projection thereof in the form of a hollow cylinder 49 which is secured on the axle 9 by means of a stud 51 and of a tenon 53, the latter being received in a corresponding mortise of the axle 9. This assembly makes the cylinder 49 solid with the axle 9. The other end of the levers 45 is bent, toward the axle, in the shape of latches 55 adapted each to be inserted into a corresponding opening of the cylinder 49, which openings act as keepers for the latches 55. The said keepers have, like collar 37, a bevelled corner 57 intended to bear against the bevel 43 of the collar 37. These bevelled surfaces 43 and 57 are designed to facilitate reciprocal sliding action of the levers 45 and of the collar 37, as will be explained hereinafter. The collar 37 has slots 58 (FIGS. 5 and 6) for the passage of the latches 55. The bevelled faces 43 are provided at the bottom of the said slots. As to the locking mechanism, it comprises a bearing 59 in the shape of a ball bearing slidably mounted inside the chamber 61 of the cylinder 49 and secured on the end of a tubular elbow 63 which has a vertical branch capable of moving inside a U-shaped guide 65 securely mounted on the frame 67 of the machine. The bearing 59 is pushed outside the chamber 61 by a spring 69 but it is prevented from moving out by a split ring 71 (FIG. 5) fixed inside the chamber 61. The other end of the spring 69 bears against another split ring 72 wedging a second bearing 73 that, in turn, bears against a shoulder 75 formed at the bottom of the chamber 61. The manually operable mechanism also comprises a bowden cable 77 of which one end is held by the second bearing 73 and the other end is fixed to a L-shaped control lever 79 (see FIG. 1), after having passed through the movable elbow 63 and the usual flexible tubular sheath 81 of which one end is fixed to a bracket 83 while the other end is fixed to the movable elbow 63. The bracket 83 as well as the control handle 85 are fixed in relation to the axle 9 whereas the tubular elbow 63 is movable.

The above-described device operates as follows:

When the axle 9 is stationary, the spring 19 pushes the sleeve 15 leftward (FIG. 2) as well as the collar 37. If, at that moment, the levers 45 are in the position of FIG. 3 with the latches 55 pushed inside the chamber 61, they will pivot outwardly under the effect of the centrifugal force as soon as the axle 9 idles and before the centrifugal masses, having a greater inertia, may have any effect. The device will then be in the position shown in FIG. 2 with the latches 55 in abutment against the collar 37 which will have the effect of holding the sleeve 15 and the jaw 1. It will also be noted that the spring 69 then pushes the bearing 59 under the latches 55 to hold the latches in abutting position. The belt 7 lies at the bottom of the groove 5 and is not driven. It is then possible to increase the speed of the axle 9 at will and have it reach a desired speed without any danger of the belt 7 being driven since, as mentioned previously, the collar 37 is held captive by the latches 55 of the levers 45.

At the desired moment, that is when the starting signal of the race is given, the operator actuates the lever 79 counterclockwise thus pulling on the cable 77 but as the other end of the cable inside the chamber 61 is fixed and at least because of the bend in the elbow 63, it is the latter that moves inside the chamber 61 causing sliding motion of the bearing 59 against the action of the spring 69 and release of the latches 55. At that moment, the centrifugal masses 27 cause sliding displacement of the sleeve 15 rightward, the collar 37 then sliding over the levers 45 (see FIG. 3) because of the release of the latches 55 and under the effect of the bevelled faces 43 and 57.

Obviously, the release of the sleeve 15 and thus of the cheek 1 takes place very quickly so that it becomes possible to very suddenly apply to the belt 7 a high speed, meaning a fast acceleration. Under this impulse, the belt moves rapidly toward the periphery of the groove and takes on a position that obviously corresponds to the speed of the axle 9.

When, eventually, the speed falls again to a value that brings the belt 7 at the bottom of the groove 5 in inactive position, the spring 19 brings the collar 37 back in the position of FIG. 2 and the centrifugal force causes the lever 45 to pivot outwardly in abutment against the collar 37; the spring 69 then pushing the bearing 59 under the latches 55 to lock them.

When starting up, the above-described device also acts as a safety measure against the danger of accident resulting from the freezing of the acceleration pedal. Indeed, since the transmission is neutralized when starting up, as has been explained, there follows that freezing of the acceleration pedal will produce no effect and it will be possible to remedy this fault before starting.

We claim:

1. Device for neutralizing, when starting up, the driving effect of a pulley having truncated cheeks of which a first cheek is secured on a rotary axle whereas a second cheek is slidably mounted thereon, the cheeks being biased by a spring tending to move the second cheek away from the first one, this movement being however counteracted by a governor mounted on the axle and of which the centrifugal masses act on the second cheek to bring it back toward the first one as soon as the axle starts rotating beyond a predetermined speed, the device being characterized in the combination therewith comprising: a. a locking mechanism mounted on the axle to cooperate with the second cheek in such a way as to hold it in its movement toward the first cheek under the effect of the centrifugal masses, as soon as the axle starts rotating; b. a manually operable mechanism combined with the said locking mechanism in such a way as to release, when actuated, the second cheek when the axle reaches a speed of rotation greater than said predetermined speed, and c. wherein the locking mechanism comprises a collar interconnected with said second cheek and at least one lever pivotally mounted at one of its ends on said axle in such way that its other end moves away from the axle under the effect of the centrifugal force, the collar and the lever being so constructed that the said other end of said lever comes in abutment against said collar when the axle starts rotating and thus holds said collar, said manually operable mechanism comprising means capable of holding said lever in abutment position, said means being displaceable at will to release the said lever once the axle has reached the said predetermined speed.

2. A device as claimed in claim 1 wherein the end of the said lever coming in abutment and the abutment surface of said collar are so constructed as to allow relative sliding and facilitates release of said collar.

3. A device as claimed in claim 1 wherein said axle is hollow and defines a chamber having an opening extending across the wall thereof, wherein said lever is bent in the form of a latch at its abutting end, the said latch being movable through said opening, wherein the said means comprises a bearing slidably mounted within said chamber, and resilient means pressing said bearing beneath the end of said latch to hold said lever in abutment against the said collar; the said manually operable mechanism further comprising a tubular elbow movable in relation to said axle and at one end of which the said bearing is secured, a bowden cable passing through the said tubualr elbow and of which one end is secured inwardly in said chamber, a control lever having a pivoting axis fixed with respect to said axle, the other end of the said cable being connected to said control lever in such a way that pivoting of the latter in a predetermined direction forces the said elbow and the said bearing to move inwardly of said chamber against said resilient means to thus release said latch and allow said collar and said second cheek to move toward said first cheek.

4. A device according to claim 2 wherein said chamber is provided with a second opening through the wall thereof diametrically opposite said first opening, wherein a second lever identical to said first one is provided and of which the latch thereof is movable through said second opening.

5. A device as claimed in claim 2 wherein a second bearing is secured inside said chamber and has a fixed central portion to which the first end of said bowden cable is secured.

* * * * *